United States Patent
Wang et al.

(10) Patent No.: US 9,622,090 B2
(45) Date of Patent: Apr. 11, 2017

(54) METHOD FOR GENERATING WIRELESS VIRTUAL NETWORK AND WIRELESS NETWORK CONTROL DEVICE

(71) Applicant: Huawei Technologies Co., Ltd., Shenzhen (CN)

(72) Inventors: Bi Wang, Shenzhen (CN); Li Wen, Shenzhen (CN); Weimin Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 14/699,166

(22) Filed: Apr. 29, 2015

(65) Prior Publication Data
US 2015/0237508 A1   Aug. 20, 2015

Related U.S. Application Data

(63) Continuation of application No. PCT/CN2013/073325, filed on Mar. 28, 2013.

(30) Foreign Application Priority Data

Oct. 31, 2012 (CN) .......................... 2012 1 0427474

(51) Int. Cl.
*H04L 12/50* (2006.01)
*H04W 16/18* (2009.01)
(Continued)

(52) U.S. Cl.
CPC ......... *H04W 16/18* (2013.01); *H04L 12/4675* (2013.01); *H04W 72/04* (2013.01)

(58) Field of Classification Search
CPC ......... H04L 67/10; H04L 45/02; H04L 12/04; H04L 63/14
(Continued)

(56) References Cited

U.S. PATENT DOCUMENTS 8,356,087 B1 * 1/2013 Miller ................ H04L 63/0272
                                                        709/220
2004/0029587 A1   2/2004 Hulkkonen et al.
(Continued)

FOREIGN PATENT DOCUMENTS

CN         1432258 A         7/2003
CN         1685758 A        10/2005
(Continued)

OTHER PUBLICATIONS

McKeown et al., "OpenFlow: Enabling Innovation in Campus Networks," ACM SIGCOMM Computer Communication Review, vol. 38, Issue 2, pp. 69-74, Association for Computing Machinery, New York, New York (Apr. 2008).

*Primary Examiner* — Ricky Ngo
*Assistant Examiner* — Dewanda Samuel
(74) *Attorney, Agent, or Firm* — Leydig, Voit & Mayer, Ltd.

(57) ABSTRACT

A method for generating a wireless virtual network and a wireless network control device are provided. In some feasible embodiments of the present invention, a wireless network control device responds to a wireless virtual network establishment/modification request of a wireless virtual network demander, and configures a base station according to the wireless virtual network establishment/modification request. The wireless network control device receives configuration completion response of the base station, confirms the success of wireless virtual network establishment/modification, and sends a parameter of the wireless virtual network to the wireless virtual network demander. Then, the wireless network control device receives a parameter confirmation message of the wireless virtual network demander, and the wireless virtual network takes effect.

18 Claims, 7 Drawing Sheets

(51) Int. Cl.
*H04L 12/46* (2006.01)
*H04W 72/04* (2009.01)

(58) Field of Classification Search
USPC .................................... 370/546, 386, 385
See application file for complete search history.

(56) References Cited

U.S. PATENT DOCUMENTS

| | | | |
|---|---|---|---|
| 2005/0047329 A1* | 3/2005 | Almog | H04L 69/16 370/225 |
| 2005/0260997 A1 | 11/2005 | Korale et al. | |
| 2007/0167175 A1 | 7/2007 | Wong et al. | |
| 2007/0298788 A1* | 12/2007 | Corson | H04W 8/12 455/433 |
| 2009/0017809 A1* | 1/2009 | Jethi | G06Q 30/00 455/418 |
| 2010/0017861 A1 | 1/2010 | Krishnaswamy et al. | |
| 2012/0051296 A1 | 3/2012 | Kokku et al. | |
| 2013/0182606 A1* | 7/2013 | So | H04L 12/4641 370/254 |

FOREIGN PATENT DOCUMENTS

| | | |
|---|---|---|
| WO | WO 2007037867 A2 | 4/2007 |
| WO | WO 2012055448 A1 | 5/2012 |

* cited by examiner

METHOD FOR GENERATING WIRELESS VIRTUAL NETWORK AND WIRELESS NETWORK CONTROL DEVICE

CROSS-REFERENCE TO RELATED APPLICATIONS

This application is a continuation of International Patent Application No. PCT/CN2013/073325, filed on Mar. 28, 2013, which claims priority to Chinese Patent Application No. 201210427474.5, filed on Oct. 31, 2012, both of which are hereby incorporated by reference in their entireties.

FIELD OF THE INVENTION

The present invention relates to the technical field of wireless communications, and particularly, to a method for generating a wireless virtual network and a wireless network control device.

BACKGROUND OF THE INVENTION

The existing third generation partnership project (3GPP) standard determines two network sharing architectures of long time evolution (LTE), one is gateway core network configuration, and the other is multi-operator core network configuration. For a multi-operator core network, the network sharing architecture is divided into total carrier frequency sharing and sub-carrier frequency sharing. Under the total carrier frequency sharing, wireless access network resources are shared between multiple operators, including carrier frequency resources and base station hardware resources. Under the sub-carrier frequency sharing, different operators have independent carrier frequency resources and only share the base station hardware resources.

For the existing wireless access network sharing, related parameters and properties need to be configured and maintained by an operation and maintenance team, and dynamic on-demand coordination and customization could not be achieved. In addition, multiple operators sharing the wireless access network may only adopt the same algorithmic characteristic.

SUMMARY OF THE INVENTION

Embodiments of the present invention provide a method for generating a wireless virtual network and a wireless network control device, which may be used for achieving on-demand customization of the wireless virtual network.

The first aspect of the present invention provides a method for generating a wireless virtual network, including: responding to, by a wireless network control device, a wireless virtual network establishment/modification request of a wireless virtual network demander, and configuring a base station according to the wireless virtual network establishment/modification request; receiving, by the wireless network control device, configuration completion response of the base station, confirming the success of wireless virtual network establishment/modification, and sending a parameter of the wireless virtual network to the wireless virtual network demander; and receiving, by the wireless network control device, a parameter confirmation message of the wireless virtual network demander, wherein the wireless virtual network takes effect.

In the first possible implementation manner, the wireless virtual network establishment/modification request includes a parameter of an expected wireless virtual network of the wireless virtual network demander, wherein the parameter of the expected wireless virtual network includes a geographic position of the base station selected by the wireless virtual network demander and a wireless virtual network establishment policy.

In combination with the first possible implementation manner, in the second possible implementation manner, the step of configuring a base station according to the wireless virtual network establishment/modification request further includes: generating, by the wireless network control device, an air interface resource parameter according to the parameter of the expected wireless virtual network; and configuring, by the wireless network control device, an identifier of the wireless virtual network demander, the wireless virtual network establishment policy and the air interface resource parameter to the selected base station.

In combination with the first possible implementation manner, in the third possible implementation manner, the step of responding to, by a wireless network control device, a wireless virtual network establishment/modification request of a wireless virtual network demander, and configuring a base station according to the wireless virtual network establishment/modification request, further includes: responding to, by the wireless network control device, a wireless virtual network establishment/modification request based on a fixed bandwidth of the wireless virtual network demander; generating, by the wireless network control device, an air interface resource parameter according to the parameter of the expected wireless virtual network; and configuring, by the wireless network control device, an identifier of the wireless virtual network demander, a wireless virtual network establishment policy based on a fixed bandwidth and the air interface resource parameter to the selected base station.

In combination with the first possible implementation manner, in the fourth possible implementation manner, the step of responding to, by a wireless network control device, a wireless virtual network establishment/modification request of a wireless virtual network demander, and configuring a base station according to the wireless virtual network establishment/modification request, further includes: responding to, by the wireless network control device, a wireless virtual network establishment/modification request based on a bandwidth interval of the wireless virtual network demander; generating, by the wireless network control device, an air interface resource parameter according to the parameter of the expected wireless virtual network; and configuring, by the wireless network control device, an identifier of the wireless virtual network demander, a wireless virtual network establishment policy based on a bandwidth interval and the air interface resource parameter to the selected base station.

In combination with the first possible implementation manner, in the fifth possible implementation manner, the step of responding to, by a wireless network control device, a wireless virtual network establishment/modification request of a wireless virtual network demander, and configuring a base station according to the wireless virtual network establishment/modification request, further includes: responding to, by the wireless network control device, a wireless virtual network establishment/modification request based on actual traffic of the wireless virtual network demander; and configuring, by the wireless network control device, an identifier of the wireless virtual network demander and a wireless virtual network establishment policy based on actual traffic to the selected base station.

In combination with the first aspect of the present invention or one of the first to the fifth possible implementation manners of the present invention, in the sixth possible implementation manner, before the responding to, by a wireless network control device, a wireless virtual network establishment/modification request of a wireless virtual network demander, the method further includes: broadcasting, by the wireless network control device, a network parameter of a wireless access network.

In combination with the sixth possible implementation manner, in the seventh possible implementation manner, before the responding to, by a wireless network control device, a wireless virtual network establishment/modification request of a wireless virtual network demander, the method further includes: determining, by the wireless network control device, whether the wireless virtual network establishment/modification request is satisfied according to the network parameter of the wireless access network and the wireless virtual network establishment/modification request.

In combination with the seventh possible implementation manner, in the eighth possible implementation manner, after the determining, by the wireless network control device, whether the wireless virtual network establishment/modification request is satisfied according to the network parameter of the wireless access network and the wireless virtual network establishment/modification request, the method further includes: if the wireless virtual network establishment/modification request could not be satisfied, feeding back that the wireless virtual network demander could not establish/modify the wireless virtual network.

The second aspect of the present invention provides a wireless network control device, including:

a storing module, configured to store a network parameter of a wireless access network where the wireless network control device is located;

a determining module, configured to respond to a wireless virtual network establishment/modification request of a wireless virtual network demander; and a wireless virtual network establishing module, configured to configure a base station according to the wireless virtual network establishment/modification request, receive configuration completion response of the base station, confirm success of wireless virtual network establishment/modification, send the parameter of the wireless virtual network to the wireless virtual network demander, and receive a parameter confirmation message of the wireless virtual network demander, wherein the wireless virtual network takes effect.

In the first possible implementation manner, the wireless virtual network establishment/modification request includes a parameter of an expected wireless virtual network of the wireless virtual network demander, wherein the parameter of the expected wireless virtual network includes a geographic position of the base station selected by the wireless virtual network demander and a wireless virtual network establishment policy.

In combination with the first possible implementation manner, in the second possible implementation manner, the wireless virtual network establishing module is further configured to generate an air interface resource parameter according to the parameter of the expected wireless virtual network, and configure an identifier of the wireless virtual network demander, the wireless virtual network establishment policy and the air interface resource parameter to the selected base station.

In combination with the first possible implementation manner, in the third possible implementation manner, the determining module is further configured to respond to a wireless virtual network establishment/modification request based on a fixed bandwidth of the wireless virtual network demander, and the wireless virtual network establishing module is further configured to generate an air interface resource parameter according to the parameter of the expected wireless virtual network, and configure an identifier of the wireless virtual network demander, a wireless virtual network establishment policy based on a fixed bandwidth and the air interface resource parameter to the selected base station.

In combination with the first possible implementation manner, in the fourth possible implementation manner, the determining module is further configured to respond to a wireless virtual network establishment/modification request based on a bandwidth interval of the wireless virtual network demander, and the wireless virtual network establishing module is further configured to generate an air interface resource parameter according to the parameter of the expected wireless virtual network, and configure an identifier of the wireless virtual network demander, a wireless virtual network establishment policy based on a bandwidth interval and the air interface resource parameter to the selected base station.

In combination with the first possible implementation manner, in the fifth possible implementation manner, the determining module is further configured to respond to a wireless virtual network establishment/modification request based on actual traffic of the wireless virtual network demander, and the wireless virtual network establishing module is further configured to configure an identifier of the wireless virtual network demander and a wireless virtual network establishment policy based on actual traffic to the selected base station.

In combination with the second aspect of the present invention or one of the first to the fifth possible implementation manners of the second aspect, in the sixth possible implementation manner, the wireless network control device further includes a broadcasting module, configured to broadcast a network parameter of a wireless access network.

In combination with the sixth possible implementation manner, in the seventh possible implementation manner, the determining module is further configured to determine whether the wireless virtual network establishment/modification request is satisfied according to the network parameter of the wireless access network and the wireless virtual network establishment/modification request.

In combination with the seventh possible implementation manner, in the eighth possible implementation manner, if the wireless virtual network establishment/modification request could not be satisfied, the determining module is further configured to feed back that the wireless virtual network demander could not establish/modify the wireless virtual network.

The third aspect of the present invention provides a wireless network control device, including: an input device, an output device, a memory and a processor, wherein the processor implements the following steps: responding to a wireless virtual network establishment/modification request of a wireless virtual network demander, and configuring a base station according to the wireless virtual network establishment/modification request; receiving configuration completion response of the base station, confirming the success of wireless virtual network establishment/modification, and sending a parameter of the wireless virtual network to the wireless virtual network demander; and receiving a parameter confirmation message of the wireless virtual network demander, wherein the wireless virtual network takes effect.

In the first possible implementation manner, the wireless virtual network establishment/modification request includes a parameter of an expected wireless virtual network of the wireless virtual network demander, wherein the parameter of the expected wireless virtual network includes a geographic position of the base station selected by the wireless virtual network demander and a wireless virtual network establishment policy.

In combination with the first possible implementation manner, in the second possible implementation manner, the step of configuring a base station according to the wireless virtual network establishment/modification request implemented by the processor further includes: generating an air interface resource parameter according to the parameter of the expected wireless virtual network; and configuring an identifier of the wireless virtual network demander, the wireless virtual network establishment policy and the air interface resource parameter to the selected base station.

In combination with the first possible implementation manner, in the third possible implementation manner, the step of responding to a wireless virtual network establishment/modification request of a wireless virtual network demander, and configuring a base station according to the wireless virtual network establishment/modification request implemented by the processor, further includes: responding to a wireless virtual network establishment/modification request based on a fixed bandwidth of the wireless virtual network demander; generating an air interface resource parameter according to the parameter of the expected wireless virtual network; and configuring an identifier of the wireless virtual network demander, a wireless virtual network establishment policy based on a fixed bandwidth and the air interface resource parameter to the selected base station.

In combination with the first possible implementation manner, in the fourth possible implementation manner, the step of responding to a wireless virtual network establishment/modification request of a wireless virtual network demander, and configuring a base station according to the wireless virtual network establishment/modification request implemented by the processor, further includes: responding to a wireless virtual network establishment/modification request based on a bandwidth interval of the wireless virtual network demander; generating an air interface resource parameter according to the parameter of the expected wireless virtual network; and configuring an identifier of the wireless virtual network demander, a wireless virtual network establishment policy based on a bandwidth interval and the air interface resource parameter to the selected base station.

In combination with the first possible implementation manner, in the fifth possible implementation manner, the step of responding to a wireless virtual network establishment/modification request of a wireless virtual network demander, and configuring a base station according to the wireless virtual network establishment/modification request implemented by the processor, further includes: responding to a wireless virtual network establishment/modification request based on actual traffic of the wireless virtual network demander; and configuring an identifier of the wireless virtual network demander and a wireless virtual network establishment policy based on actual traffic to the selected base station.

In combination with the third aspect of the present invention or one of the first to the fifth possible implementation manners of the third aspect of the present invention, in the sixth possible implementation manner, before implementing the step of responding to a wireless virtual network establishment/modification request of a wireless virtual network demander, the processor further implements the following step: broadcasting a network parameter of a wireless access network.

In combination with the sixth possible implementation manner, in the seventh possible implementation manner, before implementing the step of responding to a wireless virtual network establishment/modification request of a wireless virtual network demander, the processor further implements the following step: determining whether the wireless virtual network establishment/modification request is satisfied according to the network parameter of the wireless access network and the wireless virtual network establishment/modification request.

In combination with the seventh possible implementation manner, in the eighth possible implementation manner, after determining whether the wireless virtual network establishment/modification request is satisfied according to the network parameter of the wireless access network and the wireless virtual network establishment/modification request, the processor further implements the following step: if the wireless virtual network establishment/modification request could not be satisfied, feeding back that the wireless virtual network demander could not establish/modify the wireless virtual network.

The above-mentioned method of generating wireless virtual network may be used for flexibly and conveniently completing request, consultation, parameter configuration or programming of the wireless virtual network by means of the centralized control function of the wireless network control device and finally achieving the on-demand customization of the wireless virtual network.

In addition, the above-mentioned method of generating wireless virtual network is used for achieving the on-demand customization of the wireless virtual network, and due to the isolation property required by virtualization, different wireless virtual network demanders may adopt different policies.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skills in the art without any creative effort.

DETAILED DESCRIPTION OF THE EMBODIMENTS

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of the other embodiments, obtained by those of ordinary skills in the art based on the embodiments of the present invention without any creative effort, fall into the protection scope of the present invention.

Figure 1:
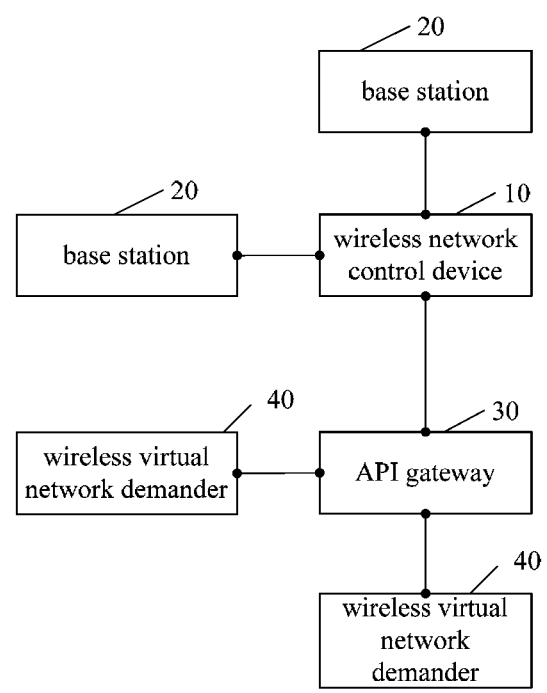
FIG. 1 is a schematic diagram of an application environment provided by an embodiment of the present invention.

Please see FIG. 1, it is a schematic diagram of an application environment provided by an embodiment of the present invention. In the embodiment, a wireless network control device 10 is connected with multiple base stations 20 (merely two base stations are taken as an example in the figure) to form a wireless access network, so as to enable a mobile terminal to perform wireless access through the base stations 20. The wireless network control device 10 is further connected with multiple wireless virtual network demanders 40 (merely two wireless virtual network demanders are taken as an example in the figure) through an application program interface (API) gateway 30. In some embodiments of the present invention, the wireless network control device 10 is connected with each base station 20 through an interface capable of transmitting control signaling, for example, an S1 interface. The wireless network control device 10 is connected with the API gateway 30 through an interface capable of transmitting request signaling and data, for example, an interface based on a hypertext transfer protocol.

The wireless network control device 10 serves as a centralized control point of the base stations 20 to perform centralized management and control on the wireless access network. The base stations 20 act according to the control signaling of the wireless network control device 10, and may be various types of base stations, for example, a macro base station, a heterogeneous network base station and the like. Different wireless virtual network demanders 40, for example, a wireless virtual network operator customizes and consults the necessary wireless virtual network in user-defined and programmable manners by means of an API interface provided by the API gateway 30. The wireless network control device 10 performs parameter configuration and control on the base stations 20 according to the requests of different wireless virtual network demanders 40, and after receiving configuration parameters, the base stations 20 generate different wireless virtual networks by scheduling air interface resources. Therefore, multiple wireless virtual networks may be formed on a wireless access network entity formed by the wireless network control device 10 and the base stations 20, for enabling users of the wireless virtual network demanders 40 to perform network access through corresponding wireless virtual networks.

Figure 2:
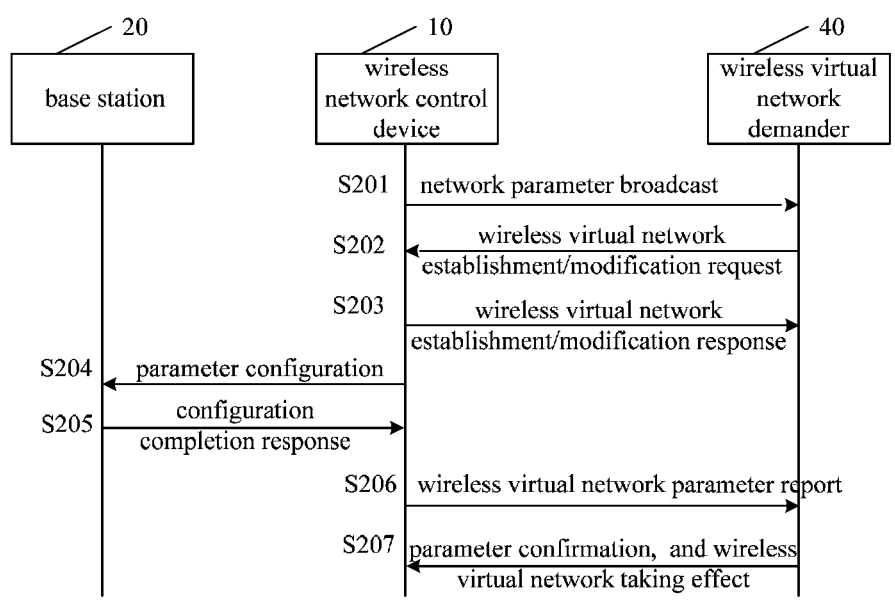
FIG. 2 to FIG. 6 are respectively schematic diagrams of flows of methods for generating a wireless virtual network provided by embodiment 1 to embodiment 5 of the present invention.

See FIG. 2 and the schematic diagram of the application environment of FIG. 1. A method for generating a wireless virtual network provided by embodiment 1 of the present invention includes:

S201, the wireless network control device 10 broadcasts a network parameter of a wireless access network. The wireless network control device 10 presents the network parameter of the wireless access network to the wireless virtual network demander 40 in a broadcasting manner through the interface based on the hypertext transfer protocol and the API gateway 30. The wireless virtual network demander 40 may be a wireless virtual network operator and may also be a third party content provider cooperating with the wireless virtual network operator. The broadcasted network parameter of the wireless access network includes a geographic position parameter of the base station 20, the configuration (bandwidth and antenna configuration and the like) of the base station 20, a frequency point, a system bandwidth and an available bandwidth and the like.

S202, the wireless virtual network demander 40 sends a wireless virtual network establishment/modification request. After acquiring the network parameter of the wireless access network, the wireless virtual network demander 40 sends the wireless virtual network establishment/modification request through the API gateway 30 according to its own operation policy. The wireless virtual network establishment/modification request includes a parameter of an expected wireless virtual network of the wireless virtual network demander 40, and the parameter of the expected wireless virtual network includes the geographic position parameter of the base station 20 and a wireless virtual network establishment policy, for example, an establishment policy based on bandwidth or traffic. The parameter of the expected wireless virtual network further includes a main service type and a pricing rule and the like. The wireless virtual network demander 40 selects or inputs the base station or the wireless virtual network establishment policy and the like on an interface presented by the API gateway 30, in order to generate the wireless virtual network establishment/modification request. The wireless virtual network establishment/modification request may be triggered by the wireless virtual network demander 40 based on the operation policy and may also be triggered by a terminal user by requesting the wireless virtual network demander 40 based on service demand or experience.

S203, the wireless network control device 10 responds to the wireless virtual network establishment/modification request of the wireless virtual network demander 40. The wireless network control device 10 consults with the wireless virtual network demander 40 by combining the network parameter of the wireless access network with the wireless virtual network establishment/modification request of the wireless virtual network demander 40. If the consultation is successful, the wireless network control device 10 feeds back to accept the request of the wireless virtual network demander 40. If the consultation is not successful, the wireless network control device 10 feeds back that the wireless virtual network demander 40 could not establish/modify the wireless virtual network and the reason thereof, for example, the reason is that the expected bandwidth of the wireless virtual network demander 40 could not be satisfied. Then, turning to S202, the wireless virtual network demander 40 adjusts its own wireless virtual network establishment policy according to the feedback of the wireless network control device 10 and initiates the wireless virtual network establishment/modification request again.

S204, the wireless network control device 10 configures the base station 20 according to the wireless virtual network establishment/modification request. After determining that the wireless virtual network establishment/modification request of the wireless virtual network demander 40 may be satisfied according to the network parameter of the wireless access network 10, the wireless network control device 10 generates an air interface resource parameter according to the parameter of the expected wireless virtual network and configures an identifier of the wireless virtual network demander 40, the wireless virtual network establishment policy and the air interface resource parameter to the base station 20 selected by the wireless virtual network demander 40. The air interface resource parameter includes such parameters as time frequency, power and bandwidth and the like.

S205, in the scheduling process of each transmission time interval (TTI), the base station 20 virtualizes the wireless virtual network at the base station 20 according to the parameter configured by the wireless network control device 10, and sends configuration completion response.

S206, the wireless network control device 10 receives the configuration completion response of the base station 20, confirms the success of wireless virtual network establishment/modification, and sends the parameter of the established wireless virtual network to the wireless virtual network demander 40. Wherein, the parameter of the established wireless virtual network includes the parameter of the expected wireless virtual network and the air interface resource parameter.

S207, the wireless virtual network demander 40 checks and confirms the parameter of the established wireless virtual network and sends a parameter confirmation message to the wireless network control device 10, wherein the established wireless virtual network takes effect.

In the above-mentioned flow, the wireless network control device 10 is a centralized controller and integrates all the functions of a control plane. The API interface provided by the wireless network control device 10 may provide a variety of wireless virtual network establishment policies, in order to meet a diversified customization demand of the wireless virtual network.

The above-mentioned method of generating wireless virtual network may be used for flexibly and conveniently achieving request, consultation, parameter configuration or programming of the wireless virtual network by means of the centralized control function of the wireless network control device 10 under the control of an API interface of the wireless virtual network demander 40 and the base station 20, and finally achieving the on-demand customization of the wireless virtual network. In addition, the above-mentioned method of generating wireless virtual network is used for achieving the on-demand customization of the wireless virtual network, and due to the isolation property required by virtualization, different wireless virtual network demanders 40 may adopt different policies.

The wireless network control device 10 provides a variety of wireless virtual network establishment policies, including a wireless virtual network establishment policy based on actual traffic, a wireless virtual network establishment policy based on a fixed bandwidth and a wireless virtual network establishment policy based on a bandwidth interval. The method for generating the wireless virtual network based on different wireless virtual network establishment policies will be illustrated below.

Figure 3:
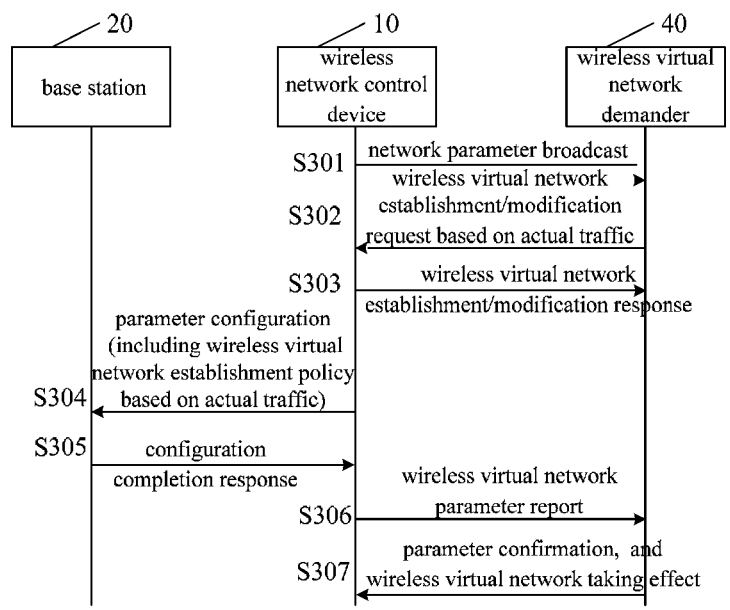

See FIG. 3 and the schematic diagram of the application environment of FIG. 1, a method for generating a wireless virtual network provided by embodiment 2 of the present invention includes S301 to S307, except step S302 and step S304, the rest steps are the same as the corresponding steps in FIG. 2, and will not be repeated redundantly herein.

Considering the dynamic and random distribution of a mobile communication terminal users in a certain area, when establishing/modifying the wireless virtual network, if the wireless virtual network demander 40 selects the wireless virtual network establishment policy based on actual traffic, in step S302, the wireless virtual network demander 40 sends a wireless virtual network establishment/modification request based on actual traffic. The wireless virtual network establishment/modification request based on actual traffic includes the parameter of the expected wireless virtual network of the wireless virtual network demander 40, and the parameter of the expected wireless virtual network includes the geographic position parameter of the base station 20 and the wireless virtual network establishment policy based on actual traffic.

S304, the wireless network control device 10 configures the base station 20 according to the wireless virtual network establishment/modification request based on actual traffic. After determining that the wireless virtual network establishment/modification request based on actual traffic of the wireless virtual network demander 40 may be satisfied according to the network parameter of the wireless access network 10, the wireless network control device 10 configures the identifier of the wireless virtual network demander 40 and the wireless virtual network establishment policy based on actual traffic to the base station 20 selected by the wireless virtual network demander 40.

In the above-mentioned method for generating the wireless virtual network, after the base station 20 receives the configuration of the wireless virtual network establishment policy based on actual traffic, the resource scheduler of the wireless virtual network demander 40 converts estimated traffic into a necessary PRB number before each transmission time interval schedules and reports the same to the base station 20. The base station 20 coordinates PRB resource demands proposed by multiple wireless virtual network demanders 40 and allocates resources to different wireless virtual network demanders 40 according to the final coordination result.

Figure 4:
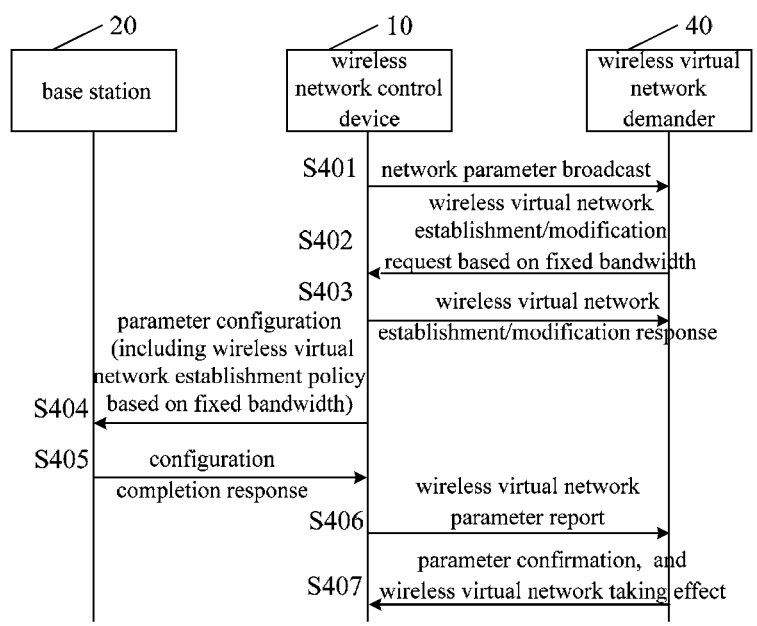

See FIG. 4 and the schematic diagram of the application environment of FIG. 1. A method for generating a wireless virtual network provided by embodiment 3 of the present invention includes S401 to S407, except step S402 and step S404, the rest steps are the same as the corresponding steps in FIG. 2, and will not be repeated redundantly herein.

Based on the analysis of service characteristics, for example, the wireless virtual network demander 40 only provides video and download services, when establishing/modifying the wireless virtual network, if the wireless virtual network demander 40 selects the wireless virtual network establishment policy based on the fixed bandwidth, and sets a fixed bandwidth value, in step S402, the wireless virtual network demander 40 sends a wireless virtual network establishment/modification request based on a fixed bandwidth. The wireless virtual network establishment/modification request based on the fixed bandwidth includes the parameter of the expected wireless virtual network of the wireless virtual network demander 40, and the parameter of the expected wireless virtual network includes the geographic position parameter of the base station 20, the wireless virtual network establishment policy based on the fixed bandwidth and the fixed bandwidth value.

S404, the wireless network control device 10 configures the base station 20 according to the wireless virtual network establishment/modification request based on the fixed bandwidth. After determining that the wireless virtual network establishment/modification request based on the fixed bandwidth of the wireless virtual network demander 40 may be satisfied according to the network parameter of the wireless access network 10, the wireless network control device 10 generates the air interface resource parameter according to the parameter of the expected wireless virtual network, and configures the identifier of the wireless virtual network demander 40, the wireless virtual network establishment policy based on the fixed bandwidth, the fixed bandwidth value and the air interface resource parameter to the base station 20 selected by the wireless virtual network demander 40.

During each transmission time interval scheduling, the base station 20 will allocate a fixed bandwidth to the wireless virtual network demander 40.

Figure 5:
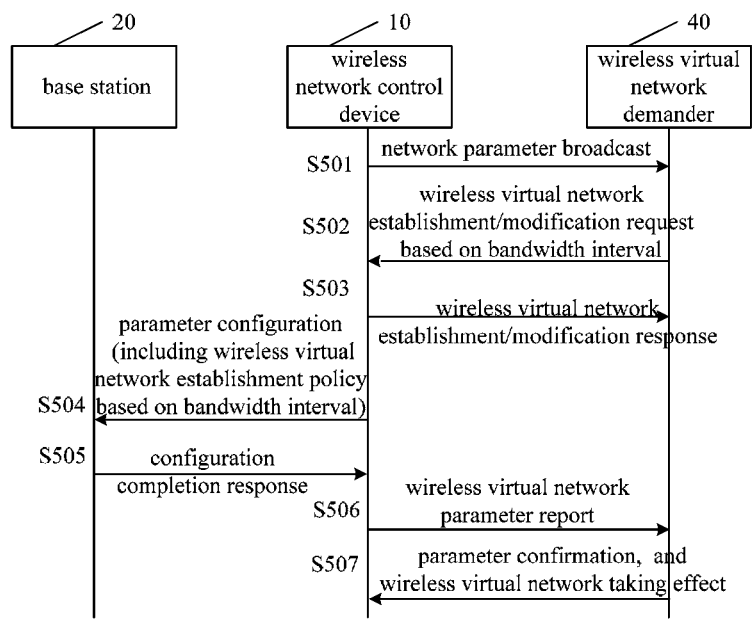

See FIG. 5 and the schematic diagram of the application environment of FIG. 1. A method for generating a wireless virtual network provided by embodiment 4 of the present invention includes S501 to S507, except step S502 and step S504, the rest steps are the same as the corresponding steps in FIG. 2, and will not be repeated redundantly herein.

The wireless virtual network demander 40 provides such services as video and voice service and the like, based on the analysis of service characteristics, when establishing/modifying the wireless virtual network, the wireless virtual network demander 40 selects the wireless virtual network establishment policy based on bandwidth, but has lowest bandwidth guarantee and highest bandwidth guarantee, in step S502, the wireless virtual network demander 40 sends a wireless virtual network establishment/modification request based on a bandwidth interval. The wireless virtual network establishment/modification request based on the bandwidth interval includes the parameter of the expected wireless virtual network of the wireless virtual network demander 40, and the parameter of the expected wireless virtual network includes the geographic position parameter of the base station 20, the wireless virtual network establishment policy based on bandwidth interval and a bandwidth interval value.

S404, the wireless network control device 10 configures the base station 20 according to the wireless virtual network establishment/modification request based on the bandwidth interval. After determining that the wireless virtual network establishment/modification request based on the bandwidth interval of the wireless virtual network demander 40 may be satisfied according to the network parameter of the wireless access network 10, the wireless network control device 10 generates the air interface resource parameter according to the parameter of the expected wireless virtual network, and configures the identifier of the wireless virtual network demander 40, the wireless virtual network establishment policy based on the bandwidth interval, a bandwidth interval value and the air interface resource parameter to the base station 20 selected by the wireless virtual network demander 40.

During each transmission time interval scheduling, the base station 20 will consult and allocate according to resource request conditions of multiple wireless virtual network demanders 40 and finally allocate the bandwidths within one request bandwidth interval to the wireless virtual network demanders 40.

Figure 6:
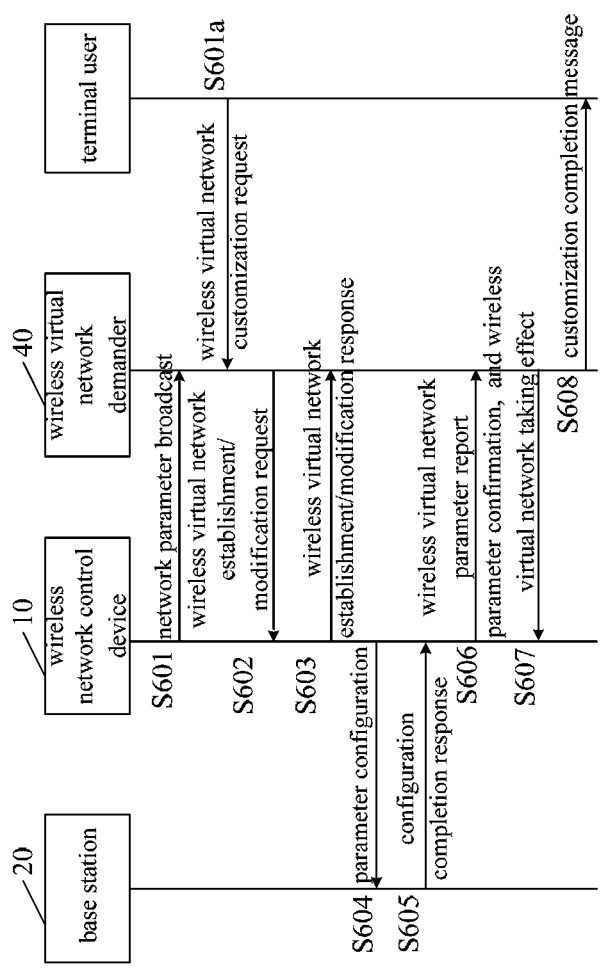

Due to the isolation property between the wireless virtual networks, the wireless virtual network demander 40 may implement different policies through the wireless virtual networks, for example, QoS, time delay and the like, thus under some conditions, a terminal user may request the wireless virtual network demander 40 to establish a wireless virtual network for the same through the wireless access network, due to service demand or in order to acquire better experience. After receiving the request, the wireless virtual network demander 40 processes the request and initiates a request to the wireless network control device 10 according to the specific request (for example, improving the QoS level, reducing time delay) of the terminal user after determining the feasibility of the request. See FIG. 6 and the schematic diagram of the application environment of FIG. 1. A method for generating a wireless virtual network provided by embodiment 5 of the present invention includes S601 to S607 and S601a, except steps S602, S604, S608 and S601a, the rest steps are the same as the corresponding steps in FIG. 2, and will not be repeated redundantly herein.

S601a is implemented after step S601, in S601a, the terminal user may initiate a wireless virtual network customization request to the wireless virtual network demander 40 through the wireless access network, due to service demand or in order to acquire better experience.

In step S602, the wireless virtual network demander 40 sends a wireless virtual network establishment/modification request based on a user request. When requesting the wireless virtual network through the API gateway 30, the wireless virtual network demander 40 will select a corresponding wireless virtual network establishment policy according to specific service and request of the terminal user, for example, improving QoS level, reducing time delay and the like. The wireless virtual network establishment/modification request based on the user request includes the parameter of the expected wireless virtual network of the wireless virtual network demander 40, and the parameter of the expected wireless virtual network includes the geographic position parameter of the base station 20, a wireless virtual network establishment policy selected based on the user request and a corresponding parameter value, for example, a QoS or time delay parameter.

S604, the wireless network control device 10 configures the base station 20 according to the wireless virtual network establishment/modification request based on the user request. After determining that the wireless virtual network establishment/modification request based on the user request of the wireless virtual network demander 40 may be satisfied according to the network parameter of the wireless access network, the wireless network control device 10 generates the air interface resource parameter according to the parameter of the expected wireless virtual network, and configures the identifier of the wireless virtual network demander 40, the wireless virtual network establishment policy selected based on the user request, the corresponding parameter value and the air interface resource parameter to the base station 20 selected by the wireless virtual network demander 40.

S608, the wireless virtual network demander 40 sends a wireless virtual network customization completion message to the terminal user, so that the terminal user may connect to a network through the customized wireless virtual network to ensure better experience or ensure the service quality.

It may be understood that, the wireless network control device 10 may be any device with calculation and control functions, and the like.

The above-mentioned method of generating wireless virtual network may be used for flexibly and conveniently achieving request, consultation, parameter configuration or programming of the wireless virtual network by means of the centralized control function of the wireless network control device 10 under the control of an API interface of the wireless virtual network demander 40 and the base station 20, and finally achieving the on-demand customization of the wireless virtual network. In addition, the above-mentioned method of generating wireless virtual network is used for achieving the on-demand customization of the wireless virtual network, and due to the isolation property required by virtualization, different wireless virtual network demanders 40 may adopt different policies.

In order to better implement the above-mentioned solutions of the embodiments of the present invention, related apparatuses for cooperatively implementing the above-mentioned solutions are provided below.

Figure 7:
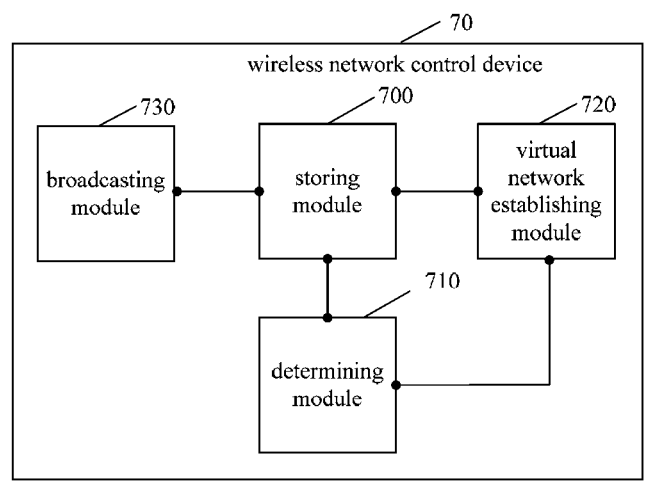
FIG. 7 is a schematic diagram of a wireless network control device provided by an embodiment of the present invention.

See FIG. 7, a wireless network control device 70 provided by the embodiment of the present invention includes a storing module 700, a determining module 710, a wireless virtual network establishing module 720 and a broadcasting module 730.

Wherein, the storing module 700 is configured to store a network parameter of a wireless access network where the wireless network control device 70 is located, and the wireless access network where the wireless network control device 70 is located includes the wireless network control device 70 and multiple base stations. The network parameter of the wireless access network includes geographic position parameters of the base stations, the configuration (bandwidth and antenna configuration and the like) of the base stations, a frequency point, a system bandwidth and an available bandwidth and the like. In some embodiments of the present invention, the storing module 700 exists in the form of a database.

The broadcasting module 730 is configured to broadcast the network parameter of the wireless access network. In some embodiments of the present invention, the broadcasting module 730 broadcasts the network parameter of the wireless access network to a wireless virtual network demander through an API gateway. After acquiring the network parameter of the wireless access network, the wireless virtual network demander sends a wireless virtual network establishment/modification request through the API gateway according to its own operation policy. The wireless virtual network establishment/modification request includes a parameter of an expected wireless virtual network of the wireless virtual network demander, and the parameter of the expected wireless virtual network includes a geographic position parameter of the base station 20 and a wireless virtual network establishment policy, for example, an establishment policy based on bandwidth or traffic. The parameter of the expected wireless virtual network further includes a main service type and a pricing rule and the like.

The determining module 710 is configured to respond to the wireless virtual network establishment/modification request of the wireless virtual network demander. In some embodiments of the present invention, the determining module 710 is further configured to determine whether the wireless access network satisfies the wireless virtual network establishment/modification request according to the network parameter of the wireless access network and the wireless virtual network establishment/modification request, and consult with the wireless virtual network demander. If the consultation is successful, the determining module 710 feeds back to accept the request of the wireless virtual network demander 40, in order to respond to the wireless virtual network establishment/modification request of the wireless virtual network demander. If the consultation is not successful, the determining module 710 feeds back that the wireless virtual network demander could not establish/modify the wireless virtual network and the reason thereof, for example, the reason is that the expected bandwidth of the wireless virtual network demander could not be satisfied.

The wireless virtual network establishing module 720 is configured to configure the base station according to the wireless virtual network establishment/modification request, receive configuration completion response of the base station, confirm the success of wireless virtual network establishment/modification, send the parameter of the established wireless virtual network to the wireless virtual network demander, and receive a parameter confirmation message of the wireless virtual network demander, wherein the wireless virtual network takes effect.

In some embodiments of the present invention, when the determining module 710 determines that the wireless virtual network establishment/modification request of the wireless virtual network demander may be satisfied, the wireless virtual network establishing module 720 is further configured to generate an air interface resource parameter according to the parameter of the expected wireless virtual network, and configure an identifier of the wireless virtual network demander, the wireless virtual network establishment policy and the air interface resource parameter to the base station selected by the wireless virtual network demander. The air interface resource parameter includes such parameters as time frequency, power and bandwidth and the like. Wherein, the parameter of the established wireless virtual network includes the parameter of the expected wireless virtual network and the air interface resource parameter.

In some embodiments of the present invention, the determining module 710 is further configured to respond to a wireless virtual network establishment/modification request based on a fixed bandwidth of the wireless virtual network demander, and the wireless virtual network establishing module 720 is further configured to generate the air interface resource parameter according to the parameter of the expected wireless virtual network, and configure the identifier of the wireless virtual network demander, a wireless virtual network establishment policy based on a fixed bandwidth, a fixed bandwidth value and the air interface resource parameter to the selected base station.

In some embodiments of the present invention, the determining module 710 is further configured to respond to a wireless virtual network establishment/modification request based on a bandwidth interval of the wireless virtual network demander, and the wireless virtual network establishing module 720 is further configured to generate the air interface resource parameter according to the parameter of the expected wireless virtual network, and configure the identifier of the wireless virtual network demander, a wireless virtual network establishment policy based on a bandwidth interval, a bandwidth interval value and the air interface resource parameter to the selected base station.

In some embodiments of the present invention, the determining module 710 is further configured to respond to a wireless virtual network establishment/modification request based on actual traffic of the wireless virtual network demander, and the wireless virtual network establishing module 720 is further configured to configure the identifier of the wireless virtual network demander and a wireless virtual network establishment policy based on actual traffic to the selected base station.

In some embodiments of the present invention, the wireless network control device 70 is a centralized controller and integrates all the functions of a control plane, and the wireless network control device 70 may provide a variety of wireless virtual network establishment policies, in order to meet a diversified customization demand of the wireless virtual network.

For example, the wireless network control device 70 in the embodiment may be any device with calculation and control functions, such as a computer or the like.

It may be understood that, the functions of the functional modules of the wireless network control device 70 in the embodiment may be specifically implemented according to the methods in embodiment 1 to embodiment 5 of the above-mentioned method, the specific implementation process thereof may refer to related descriptions in embodiment 1 to embodiment 5 of the above-mentioned method, and will not be repeated redundantly herein.

Thus, the wireless network control device 70 in the embodiment may be used for flexibly and conveniently achieving request, consultation, parameter configuration or programming of the wireless virtual network by means of the centralized control function and control on the base station 20, and finally achieving the on-demand customization of the wireless virtual network. In addition, the above-mentioned method of generating wireless virtual network is used for achieving the on-demand customization of the wireless virtual network, and due to the isolation property required by virtualization, different wireless virtual network demanders may adopt different policies.

Figure 8:
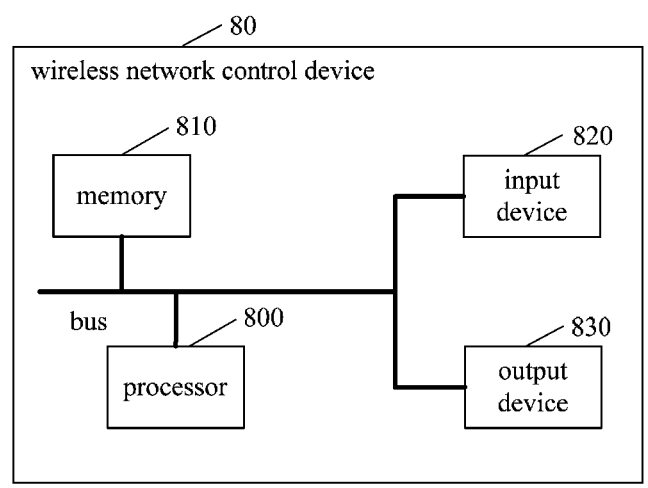
FIG. 8 is a schematic diagram of another wireless network control device provided by an embodiment of the present invention.

See FIG. 8, the embodiment of the present invention further provides a wireless network control device 80, including a processor 800, a memory 810, an input device 820 and an output device 830 (there may be one or multiple processors 800 in the wireless network control device 80, and one processor is taken as an example in FIG. 8). In some embodiments of the present invention, the input device 820, the output device 830, the memory 810 and the processor 800 may be connected through buses or in other manners, wherein bus connection is taken as an example in FIG. 8.

Wherein the processor 800 implements the following steps: broadcasting a network parameter of a wireless access network; responding to a wireless virtual network establishment/modification request of a wireless virtual network demander, and configuring a base station according to the wireless virtual network establishment/modification request; receiving configuration completion response of the base station, confirming the success of wireless virtual network establishment/modification, and sending a parameter of the established wireless virtual network to the wireless virtual network demander; and receiving a parameter confirmation message of the wireless virtual network demander, wherein the established wireless virtual network takes effect.

In some embodiments of the present invention, the wireless virtual network establishment/modification request includes a parameter of an expected wireless virtual network of the wireless virtual network demander, and the parameter of the expected wireless virtual network includes a geographic position of the base station selected by the wireless virtual network demander and a wireless virtual network establishment policy.

In some embodiments of the present invention, the step of configuring a base station according to the wireless virtual network establishment/modification request implemented by the processor 800 further includes: generating an air interface resource parameter according to the parameter of the expected wireless virtual network; and configuring an identifier of the wireless virtual network demander, the wireless virtual network establishment policy and the air interface resource parameter to the selected base station.

In some embodiments of the present invention, the step of responding to a wireless virtual network establishment/modification request of a wireless virtual network demander, and configuring a base station according to the wireless virtual network establishment/modification request implemented by the processor 800, further includes: responding to a wireless virtual network establishment/modification request based on a fixed bandwidth of the wireless virtual network demander; generating an air interface resource parameter according to the parameter of the expected wireless virtual network; and configuring an identifier of the wireless virtual network demander, a wireless virtual network establishment policy based on a fixed bandwidth and the air interface resource parameter to the selected base station.

In some embodiments of the present invention, the step of responding to a wireless virtual network establishment/modification request of a wireless virtual network demander, and configuring a base station according to the wireless virtual network establishment/modification request implemented by the processor 800, further includes: responding to a wireless virtual network establishment/modification request based on a bandwidth interval of the wireless virtual network demander; generating an air interface resource parameter according to the parameter of the expected wireless virtual network; and configuring an identifier of the wireless virtual network demander, a wireless virtual network establishment policy based on a bandwidth interval and the air interface resource parameter to the selected base station.

In some embodiments of the present invention, the step of responding to a wireless virtual network establishment/modification request of a wireless virtual network demander, and configuring a base station according to the wireless virtual network establishment/modification request implemented by the processor 800, further includes: responding to a wireless virtual network establishment/modification request based on actual traffic of the wireless virtual network demander; and configuring an identifier of the wireless virtual network demander and a wireless virtual network establishment policy based on actual traffic to the selected base station.

In some embodiments of the present invention, before implementing the step of responding to a wireless virtual network establishment/modification request of a wireless virtual network demander, the processor 800 further implements the following step: determining whether the wireless virtual network establishment/modification request is satisfied according to the network parameter of the wireless access network and the wireless virtual network establishment/modification request.

In some embodiments of the present invention, before implementing the step of responding to a wireless virtual network establishment/modification request of a wireless virtual network demander, the processor 800 further implements the following step: if the wireless virtual network establishment/modification request could not be satisfied, feeding back that the wireless virtual network demander could not establish/modify the wireless virtual network.

For example, the wireless network control device 80 in the embodiment may be any device with calculation and control functions, such as a computer or the like.

It may be understood that, the functions of the functional modules of the wireless network control device 80 in the embodiment may be specifically implemented according to the methods in embodiment 1 to embodiment 5 of the above-mentioned method, the specific implementation process thereof may refer to related descriptions in embodiment 1 to embodiment 5 of the above-mentioned method, and will not be repeated redundantly herein.

Thus, the wireless network control device 80 in the embodiment may be used for flexibly and conveniently achieving request, consultation, parameter configuration or programming of the wireless virtual network by means of the centralized control function and control on the base station, and finally achieving the on-demand customization of the wireless virtual network. In addition, the above-mentioned method of generating wireless virtual network is used for achieving the on-demand customization of the wireless virtual network, and due to the isolation property required by virtualization, different wireless virtual network demanders may adopt different policies.

It should be noted that, for simple description, the foregoing method embodiments are expressed as a series of action combinations, but those skilled in the art should be aware that, the present invention is not limited by the described action sequence, because according to the present invention, some steps may be performed in other sequences or at the same time. And then, those skilled in the art should also be aware that, the embodiments described in the description all belong to preferred embodiments, and the involved actions and modules are not necessary in the present invention.

In the above-mentioned embodiments, descriptions on the embodiments have different emphases, and a certain embodiment has no detailed description part and may refer to relevant descriptions in other embodiments.

To sum up, the wireless network control device in the embodiments of the present invention may be used for flexibly and conveniently achieving request, consultation, parameter configuration or programming of the wireless virtual network by means of the centralized control function and control on the base station, and finally achieving the on-demand customization of the wireless virtual network. In addition, the above-mentioned method of generating wireless virtual network is used for achieving the on-demand customization of the wireless virtual network, and due to the isolation property required by virtualization, different wireless virtual network demanders may adopt different policies.

Those of ordinary skills in the art may understand that all or a part of the steps of the methods in the above-mentioned embodiments may be implemented by a program instructing relevant hardware, the program may be stored in a computer readable storage medium, and the storage medium may include: for example, a read-only memory, a random access memory, a magnetic disk, an optical disk or the like.

The method for generating the wireless virtual network and the wireless network control device provided by the embodiments of the present invention have been described above in detail, specific examples are adopted in this paper to illustrate the principle and embodiments of the present invention, and the illustration in the above-mentioned embodiments are merely used for helping to understand the method of the present invention and the core idea thereof; meanwhile, those of ordinary skills in the art make variations on the specific embodiments and application range according to the idea of the present invention, to sum up, the contents in the description should not be understood as restriction to the present invention.

What is claimed is:

1. A method for generating a wireless virtual network, comprising:
   receiving, by a wireless network control device, a wireless virtual network establishment/modification request of a wireless virtual network demander through an application program interface gateway, wherein the wireless virtual network demander is a wireless virtual network operator or is a third party content provider cooperating with the wireless virtual network operator;
   responding, by the wireless network control device, to the wireless virtual network establishment/modification request of the wireless virtual network demander, and configuring a base station according to the wireless virtual network establishment/modification request;
   receiving, by the wireless network control device, configuration completion response of the base station, confirming success of wireless virtual network establishment/modification, and sending a parameter of the wireless virtual network to the wireless virtual network demander; and
   receiving, by the wireless network control device, a parameter confirmation message of the wireless virtual network demander, wherein the wireless virtual network takes effect.

2. The method for generating a wireless virtual network of claim 1, wherein the wireless virtual network establishment/modification request comprises a parameter of an expected wireless virtual network of the wireless virtual network demander, and the parameter of the expected wireless virtual network comprises a geographic position of the base station selected by the wireless virtual network demander and a wireless virtual network establishment policy.

3. The method for generating a wireless virtual network of claim 2, wherein the step of configuring a base station according to the wireless virtual network establishment/modification request further comprises:
   generating, by the wireless network control device, an air interface resource parameter according to the parameter of the expected wireless virtual network; and
   configuring, by the wireless network control device, an identifier of the wireless virtual network demander, the wireless virtual network establishment policy and the air interface resource parameter to the selected base station.

4. The method for generating a wireless virtual network of claim 2, wherein the step of responding, by the wireless network control device, to the wireless virtual network establishment/modification request of the wireless virtual network demander, and configuring the base station according to the wireless virtual network establishment/modification request further comprises:
   responding, by the wireless network control device, to the wireless virtual network establishment/modification request based on a fixed bandwidth of the wireless virtual network demander;
   generating, by the wireless network control device, the air interface resource parameter according to the parameter of the expected wireless virtual network; and
   configuring, by the wireless network control device, the identifier of the wireless virtual network demander, the wireless virtual network establishment policy based on a fixed bandwidth and the air interface resource parameter to the selected base station.

5. The method for generating a wireless virtual network of claim 2, wherein the step of responding, by the wireless network control device, to the wireless virtual network establishment/modification request of the wireless virtual network demander, and configuring the base station according to the wireless virtual network establishment/modification request further comprises:
   responding, by the wireless network control device, to the wireless virtual network establishment/modification request based on a bandwidth interval of the wireless virtual network demander;
   generating, by the wireless network control device, the air interface resource parameter according to the parameter of the expected wireless virtual network; and configuring, by the wireless network control device, the identifier of the wireless virtual network demander, the wireless virtual network establishment policy based on a bandwidth interval and the air interface resource parameter to the selected base station.

6. The method for generating a wireless virtual network of claim 2, wherein the step of responding, by the wireless network control device, to the wireless virtual network establishment/modification request of the wireless virtual network demander, and configuring the base station according to the wireless virtual network establishment/modification request further comprises:

responding, by the wireless network control device, to the wireless virtual network establishment/modification request based on actual traffic of the wireless virtual network demander; and configuring, by the wireless network control device, the identifier of the wireless virtual network demander and the wireless virtual network establishment policy based on actual traffic to the selected base station.

7. The method for generating a wireless virtual network of claim 1, wherein before the responding, by a wireless network control device, to the wireless virtual network establishment/modification request of the wireless virtual network demander, the method further comprises:

broadcasting, by the wireless network control device, a network parameter of a wireless access network.

8. The method for generating a wireless virtual network of claim 7, wherein before the responding, by a wireless network control device, to the wireless virtual network establishment/modification request of the wireless virtual network demander, the method further comprises:

determining, by the wireless network control device, whether the wireless virtual network establishment/modification request is satisfied according to the network parameter of the wireless access network and the wireless virtual network establishment/modification request.

9. The method for generating a wireless virtual network of claim 8, wherein after the determining, by the wireless network control device, whether the wireless virtual network establishment/modification request is satisfied according to the network parameter of the wireless access network and the wireless virtual network establishment/modification request, the method further comprises:

if the wireless virtual network establishment/modification request is not satisfied, feeding back that the wireless virtual network demander cannot establish/modify the wireless virtual network.

10. A wireless network control device, comprising:
an input device,
an output device,
a memory, and
a processor configured to implement the following steps:
receiving a wireless virtual network establishment/modification request of a wireless virtual network demander through an application program interface gateway, wherein the wireless virtual network demander is a wireless virtual network operator or is a third party content provider cooperating with the wireless virtual network operator;
responding to the wireless virtual network establishment/modification request of the wireless virtual network demander, and configuring a base station according to the wireless virtual network establishment/modification request;

receiving configuration completion response of the base station, confirming the success of wireless virtual network establishment/modification, and sending a parameter of the wireless virtual network to the wireless virtual network demander; and receiving a parameter confirmation message of the wireless virtual network demander, wherein the wireless virtual network takes effect.

11. The wireless network control device of claim 10, wherein the wireless virtual network establishment/modification request comprises a parameter of an expected wireless virtual network of the wireless virtual network demander, and the parameter of the expected wireless virtual network comprises a geographic position of the base station selected by the wireless virtual network demander and a wireless virtual network establishment policy.

12. The wireless network control device of claim 11, wherein the step of configuring the base station according to the wireless virtual network establishment/modification request implemented by the processor further comprises:

generating an air interface resource parameter according to the parameter of the expected wireless virtual network; and configuring an identifier of the wireless virtual network demander, the wireless virtual network establishment policy and the air interface resource parameter to the selected base station.

13. The wireless network control device of claim 11, wherein the step of responding to the wireless virtual network establishment/modification request of the wireless virtual network demander, and configuring the base station according to the wireless virtual network establishment/modification request implemented by the processor, further comprises:

responding to the wireless virtual network establishment/modification request based on a fixed bandwidth of the wireless virtual network demander;

generating the air interface resource parameter according to the parameter of the expected wireless virtual network; and configuring the identifier of the wireless virtual network demander, the wireless virtual network establishment policy based on a fixed bandwidth and the air interface resource parameter to the selected base station.

14. The wireless network control device of claim 11, wherein the step of responding to the wireless virtual network establishment/modification request of the wireless virtual network demander, and configuring the base station according to the wireless virtual network establishment/modification request implemented by the processor, further comprises:

responding to the wireless virtual network establishment/modification request based on a bandwidth interval of the wireless virtual network demander;

generating the air interface resource parameter according to the parameter of the expected wireless virtual network; and configuring the identifier of the wireless virtual network demander, the wireless virtual network establishment policy based on a bandwidth interval and the air interface resource parameter to the selected base station.

15. The wireless network control device of claim 11, wherein the step of responding to the wireless virtual network establishment/modification request of the wireless virtual network demander, and configuring the base station according to the wireless virtual network establishment/modification request implemented by the processor, further comprises:
 responding to the wireless virtual network establishment/modification request based on actual traffic of the wireless virtual network demander; and
 configuring the identifier of the wireless virtual network demander and the wireless virtual network establishment policy based on actual traffic to the selected base station.

16. The wireless network control device of claim 10, wherein before implementing the step of responding to the wireless virtual network establishment/modification request of the wireless virtual network demander, the processor further implements the following step:
 broadcasting a network parameter of a wireless access network.

17. The wireless network control device of claim 16, wherein before implementing the step of responding to the wireless virtual network establishment/modification request of the wireless virtual network demander, the processor further implements the following step:
 determining whether the wireless virtual network establishment/modification request is satisfied according to the network parameter of the wireless access network and the wireless virtual network establishment/modification request.

18. The wireless network control device of claim 17, wherein after determining whether the wireless virtual network establishment/modification request is satisfied according to the network parameter of the wireless access network and the wireless virtual network establishment/modification request, the processor further implements the following step:
 if the wireless virtual network establishment/modification request is not satisfied, feeding back that the wireless virtual network demander cannot establish/modify the wireless virtual network.

* * * * *